Dec. 20, 1960  E. M. HUDSON  2,965,749
CIRCULARLY SYMMETRICAL COMPOUND WEDGE ASSEMBLY
FOR ILLUMINATING INSTRUMENT FACES
Filed Feb. 1, 1960
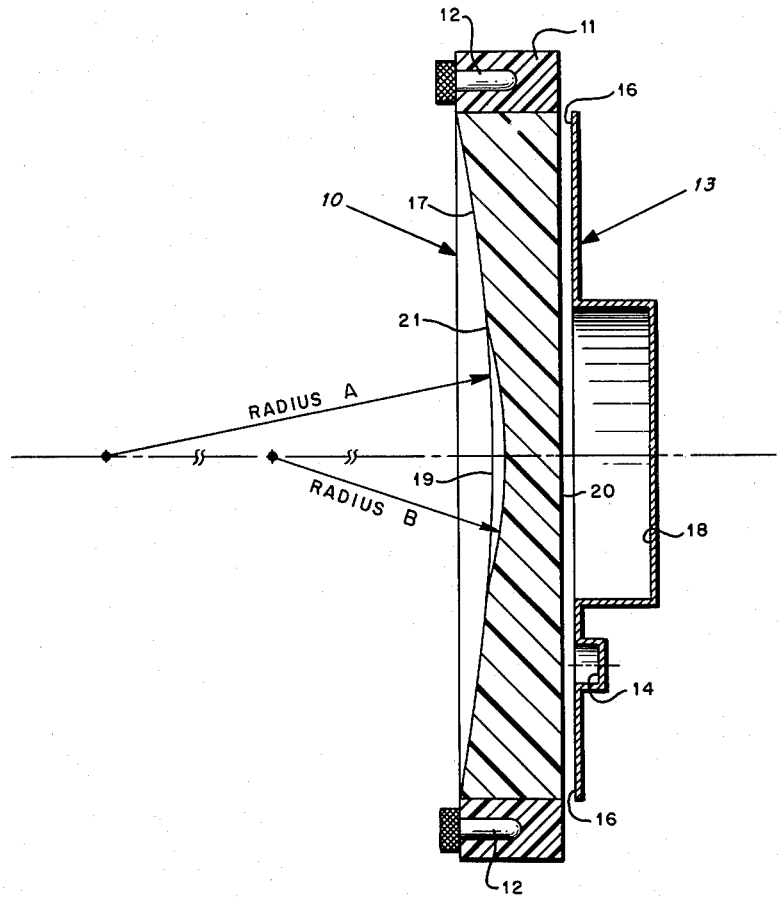
INVENTOR.
EDWIN M. HUDSON
BY
AGENT United States Patent Office 2,965,749
Patented Dec. 20, 1960

2,965,749

CIRCULARLY SYMMETRICAL COMPOUND WEDGE ASSEMBLY FOR ILLUMINATING INSTRUMENT FACES

Edwin M. Hudson, Southampton, Pa., assignor to the United States of America as represented by the Secretary of the Navy Filed Feb. 1, 1960, Ser. No. 6,074

4 Claims. (Cl. 240—2.1)

(Granted under Title 35, U.S. Code (1952), sec. 266)

The invention described herein may be manufactured and used by or for the Government of the United States of America for governmental purposes without the payment of any royalties thereon or therefor.

The present invention relates to means for illuminating instrument faces, and more particularly to means for illuminating instrument faces mounted integrally of an instrument assembly for providing controlled illumination uniformly distributed at various intensity levels over the entire surface of both individual and multiple dial instrument faces.

Heretofore, a method previously employed for a centrally recessed instrument face consisted of a thin and substantially flat transparent plate having a single dimple pressed or formed in the central portion of the face of a translucent cover plate for reflection of light rays. By this method light rays from lamps were transmitted largely through air and reflected by means of the dimple portion of the cover face onto the centrally located depressed area of a centrally recessed instrument face. Although this old method satisfactorily illuminated the central recess portion of the instrument face, the surrounding areas of the instrument face remained poorly illuminated. Furthermore, the size of the instrument was limited due to the inadequacy of the illumination.

In contradistinction thereto, it is contemplated that the instant invention will provide a means for satisfactorily illuminating large complex surfaces of compound instrument faces which cannot be satisfactorily illuminated by the old means indicated hereinabove.

Furthermore, it is contemplated that the present invention will provide means for illuminating instrument faces or dials of four inches in diameter or more whereas heretofore it was impossible by the old method to satisfactorily illuminate instrument faces beyond three inches in diameter.

One of the distinct advantages of the present invention is that lamps can be positioned around the entire perimeter of a translucent dial or cover plate and as a result the periphery need not be as thick as would be required if an even taper was provided from one side of the area to be illuminated to the other as is the case in wedge-shaped translucent cover plates wherein lamps can be placed only in the thick side of the wedge.

Another advantage of the invention is that peripheral portions of the instrument face or dial are not obscured by a deep bezel which must be placed around the edge thereof in a usually overcrowded aircraft instrument panel.

Another advantage of the invention is that by changing the radius of curvature of portions of the cover plate the light may be directed to different parts of the display area to be illuminated. This results in the satisfactory lighting of recessed areas which are ordinarily difficult to light. Furthermore, by carefully selecting a plurality of curvatures it is possible to direct more light to selected areas than would ordinarily illuminate the selected areas.

The curved surfaces of the wedge may be of constant and/or compound curvature depending upon where it is desired to concentrate the light.

One of the principal objects of the invention therefore is the provision of a novel circularly symmetrical compound wedge assembly for illuminating instrument faces.

Another object of the invention is the provision of a novel circularly symmetrical compound wedge assembly for illuminating instrument faces which may have recessed, uneven, or dark portions ordinarily hard to light or which require more light to give the appearance of being uniformly illuminated.

Yet another object of the invention is the provision of a device of the kind referred to in the preceding objects which will allow placement of lamps around the entire periphery of the wedge assembly.

Yet another object of the invention is the provision of a wedge assembly which need not be as thick on the outer edges as would ordinarily be required for a display area of a determined diameter and accordingly need not have a deep bezel around the outer peripheral edge for the purpose of reflecting light inwardly.

Yet another object of the invention is the provision of an instrument face illuminating wedge assembly which has the thinnest portion thereof in or near the center of the display rather than at one edge of the display and is capable of concentrating light at different areas.

A further object of the invention is the provision of a circularly symmetrical compound wedge assembly for illuminating instrument faces in which the curvature of the curved surfaces of the wedge may be of a constant or compound curvature.

A still further object of the invention is the provision of means for illuminating an instrument face that is lightweight, economical to manufacture, and easy to replace.

The invention further resides in certain novel features of construction, combinations and arrangements of parts, and further objects and advantages of the invention will be apparent to those skilled in the art to which it pertains from the following description of the preferred embodiment thereof described with reference to the accompanying drawing, which forms a part of the specification.

The drawing shows a vertical cross-sectional view of a circularly symmetrical device embodying the invention.

It is to be understood that the invention is not limited to the details of construction and arrangement of parts shown in the drawing and hereinafter described in detail but is capable of being otherwise embodied and of being practiced or carried out in various ways.

It is to be further understood that the phraseology or terminology employed herein is for the purpose of description and there is no intention to herein limit the invention beyond the requirements of prior art.

Referring to the drawing, a device indicated generally by the reference numeral 10 and embodying the invention comprises a disk-shaped, circularly symmetrical transparent reflecting wedge member of substantial thickness surrounded by a separate circular, planar translucent ring 11 which, if desired, can be integrally formed with the wedge 10. A plurality of lamp assemblies 12 are inserted in a conventional manner into cup-shaped or cylindrical openings formed in the ring 11 so as to radiate light radially inwardly through the wedge 10 for the purpose of illuminating a circular instrument face indicated generally by the reference numeral 13, which is the area to be illuminated. The instrument face 13 is located as closely as possible to the wedge 10 so that a flat annular face portion 14 and a circular recessed face portion 16 will each receive illumination from lamps 12 through the wedge 10 from reflections radiating from an annular arcuately-curved, semi-spherical, concave surface portion 17 having a radius A. A recessed circular face portion 18, which is centrally located in the instrument face 10, is adapted to receive illumination from the lamps 12 via the wedge 10 particularly from light reflections radiating from an arcuately-curved, semi-spherical, concave surface portion 19 having a radius B. Accordingly, the entire instrument face 13 is illuminated.

It is apparent from the drawing that the arcuate circular surface portion 17 is concentric about the arcuate central surface portion 19 and has a radius A greater than that of radius B of the surface portion 19. Accordingly, the light is especially concentrated in the portion 19 having the radius B for uniformly illuminating the deeply recessed portion 18 of the instrument face 13. Also the portion 16 of the instrument face 13, since it is in close juxtaposition with the substantially planar inner surface 20 of the wedge 10, needs a lesser concentration of light for uniform light distribution.

The circular corner or edge 21 forming the common edge of the arcuate portions 17 and 19 would form a line of light concentration which is closely adjacent to the recessed circular and eccentrically-positioned portion 14 of the instrument face 13 so that a greater light intensity is cast in that area. However, the edge 21 is broken and smoothed in order to blend and substantially remove the light concentration thereat. The part of the edge or bead 21 closest to portion 14 is preferably given a slightly sharper curvature for providing a greater concentration of light and thereby uniformly illuminating the face portion 14.

The invention has the advantage of permitting the placement of the lamps 12 in the translucent ring 11 entirely around the cylindrical periphery of the circular wedge 10. Accordingly, the wedge 10 need not be as thick at the periphery as would be necessary if it had an even taper from one side to the other of the area to be illuminated. Accordingly, a deep bezel is not required around the outer edge for the purpose of reflecting the light back towards the center of the circularly symmetrical wedge. Also, as has been pointed out, by changing the radii of curvature A and of curvature B or by the provision of additional concentric annular curvatures, the light from the lamps 12 may be directed to different portions of the area to be uniformly illuminated. Accordingly, if some part of the area to be illuminated should be recessed as are the portions 18 and 14 of the instrument face 13, it is possible to direct more light to these areas than would otherwise reflect upon the surfaces of the instrument face.

The invention in practice has been found to be extremely satisfactory in that instrument dial faces which may contain many instruments arranged geometrically can be lighted by a single wedge embodying the invention. Accordingly, the diameter of the wedge can be greater than four inches in diameter as the instant invention provides uniformly illuminated dial faces of four inches in diameter or more and still stay within a prescribed critical ratio of light intensity variation established by the manufacturer or the Armed Forces. Heretofore this has not been possible with compound instrument faces of greater than three or four inches in diameter.

Although it has been shown that the arcuate portions 17 and 19 are of a constant curvature, it is understood that compound curvatures can be used. However, constant curvatures for arcuate curvatures 17 and 19 have been disclosed herein for purposes of simplicity in illustrating the invention with the exception of the curvature of the broken or smoothed bead 21.

It is also to be understood that applicant is not to be limited to the configuration shown in the drawing since the instant configuration has been used merely to illustrate the invention and for purposes of describing the invention.

It is the intention to cover not only the preferred construction shown but all adaptations, modifications and uses thereof which come within the practice of those skilled in the art to which the invention relates and the scope of the appended claims.

What is claimed is:

1. A means for illuminating a display area having a generally planar periphery and a recessed central portion and comprising, generally disk-shaped unitary translucent means having a planar face coextensive and in juxtaposition with the planar periphery of the display area and having a concave face opposite to said planar face, integral translucent light ring means disposed about and contiguous with the periphery of said disk-shaped translucent means, said light ring means having cup-shaped openings formed therein for accommodating means for illuminating said light ring means and said disk-shaped translucent means and thereby illuminating the display area, said concave face of said disk-shaped translucent means having a spherically-shaped central portion coextensive with the recessed central portion of the display area, said central portion having a radius selected to concentrate sufficient light to uniformly illuminate the recessed central portion of the display area, said concave face of said disk-shaped translucent means having a spherically-shaped annular surface portion coaxial with said central portion and having a radius selected to concentrate sufficient light to uniformly illuminate the planar periphery of the display area, the radius of said central portion being less than the radius of said annular surface portion, and the common contiguous edge portion of said central surface portion and said annular surface portion being smoothed for uniformly dispersing and blending the illumination at said common contiguous edge portion.

2. A means for illuminating a display area having a generally planar periphery and a recessed central portion and comprising, a generally disk-shaped unitary translucent member having a planar face coextensive and in juxtaposition with the planar periphery of the display area and having a compound concave face opposite to said planar face, an integral translucent light ring disposed about and contiguous with the periphery of said disk-shaped translucent member, said light ring having cup-shaped openings formed therein for accommodating means for illuminating said light ring and said disk-shaped translucent member and thereby illuminating the display area, said compound concave face of said disk-shaped translucent member having a spherically-shaped central portion opposite the recessed central portion of the display area, said central portion having a radius selected to uniformly illuminate the recessed central portion of the display area, said concave face of said disk-shaped translucent member having a spherically-shaped circular surface portion coaxial with said central portion and having a radius selected to uniformly illuminate the planar periphery of the display area, and the radius of said central portion being less than the radius of said circular surface portion.

3. A means for illuminating a display area having a generally planar periphery and a recessed central portion and an eccentrically located recessed portion, comprising, a generally disc-shaped unitary translucent means having a planar face coextensive and in juxtaposition with the planar periphery of the display area and having a compound concave face opposite to said planar face, integral translucent light ring means disposed about and contiguous with the periphery of said disc-shaped translucent means, said light ring means having cup-shaped openings formed therein for accommodating means for illuminating said light ring means and said disc-shaped translucent means and thereby illuminating the display area, said compound concave face of said disc-shaped translucent means having a spherically-shaped concave central surface portion coaxial with the recessed central portion of the display area, said concave central surface portion having a radius selected to concentrate sufficient light to uniformly illuminate the recessed central portion of the display area, said compound concave face of said disk-shaped translucent means having a spherically-shaped circular concave surface portion coaxial with said concave central surface portion and having a radius selected to concentrate sufficient light to uniformly illuminate the planar periphery of the display area, the radius of said concave central surface portion being less than the radius of said concave circular surface portion, the common contiguous edge portion of said concave central surface portion and said concave circular surface portion being smoothly curved for uniformly dispensing and blending the illumination at said common contiguous edge portion, and the curvature of said common contiguous edge portion closest to the eccentrically located recessed portion being sharper than the balance of said common contiguous edge portion for concentrating sufficient light to uniformly illuminate the eccentrically located recessed portion of the display area.

4. In an instrument panel, a display area having a generally planar peripheral portion and a recessed central portion, a generally disk-shaped unitary translucent member having a planar face coextensive and in juxtaposition with said planar peripheral portion of said display area and having a compound concave face opposite to said planar face, an integral translucent light ring disposed about and contiguous with the periphery of said disk-shaped translucent member, said light ring having cup-shaped openings formed therein, lamp means disposed in said light ring openings for illuminating said light ring and said disk-shaped translucent member and thereby illuminating said display area, said compound concave face of said disk-shaped translucent member having a spherically-shaped concave central surface portion super-imposed over said recessed central portion of said display area, said concave central surface portion having a radius selected to concentrate sufficient light to uniformly illuminate said central portion of said display area, said compound concave face of said disk-shaped translucent member having a spherically-shaped circular concave surface portion coaxial with said concave central surface portion and having a radius selected to concentrate sufficient light to uniformly illuminate the planar peripheral portion of the display area, the radius of said concave central surface portion being less than the radius of said concave circular surface portion, and the common contiguous edge portion of said concave central surface portion and said concave circular surface portion being smoothed for uniformly dispensing and blending the illumination at said common contiguous edge portion.

References Cited in the file of this patent
UNITED STATES PATENTS

| | | |
|---|---|---|
| 1,739,954 | Du Pont | Dec. 17, 1929 |
| 2,072,849 | Dietrich | Mar. 9, 1937 |
| 2,251,984 | Cleaver et al. | Aug. 12, 1941 |
| 2,430,862 | Carscallen et al. | Nov. 18, 1947 |
| 2,673,288 | Stevens et al. | Mar. 23, 1954 |